Jan. 23, 1940.  A. H. J. DE L. ST. GENIES  2,188,019
APPARATUS FOR COPYING LENTICULAR FILMS BY PROJECTION
Filed Nov. 1, 1937  2 Sheets-Sheet 1

Inventor
Anne Henri Jacques
de Lassus Saint Genies.
by
Stone, Boyden & Mack
Attorneys Jan. 23, 1940.  A. H. J. DE L. ST. GENIES  2,188,019
APPARATUS FOR COPYING LENTICULAR FILMS BY PROJECTION
Filed Nov. 1, 1937  2 Sheets-Sheet 2

Inventor.
Anne Henri Jacques
de Lassus Saint Genies
by
Stone, Boyden & Mash
Attorneys Patented Jan. 23, 1940

2,188,019

UNITED STATES PATENT OFFICE 2,188,019

APPARATUS FOR COPYING LENTICULAR FILMS BY PROJECTION

Anne Henri Jacques de Lassus St. Genies, Versailles, France

Application November 1, 1937, Serial No. 172,290 In France November 5, 1936

5 Claims. (Cl. 88—24)

The present invention relates to the copying of lenticular original films on films of the same kind.

The invention consists in a development of the methods and devices disclosed in specification No. 2,135,396 patented November 1, 1938, and specification No. 2,136,327 patented November 8, 1938.

When the methods of the aforesaid applications are adapted and applied to the copying of lenticular films which are so arranged that the lenticulations of the copy film are non-parallel to those of the original, elementary images are obtained on the copy in the form of spots. One object of the present invention is to improve in a high degree the transparency of the positive copies so obtained. This is more fully explained hereinafter with reference to the accompanying drawings.

The invention will be fully described by way of example with reference to the accompanying drawings in which.

Figure 1:
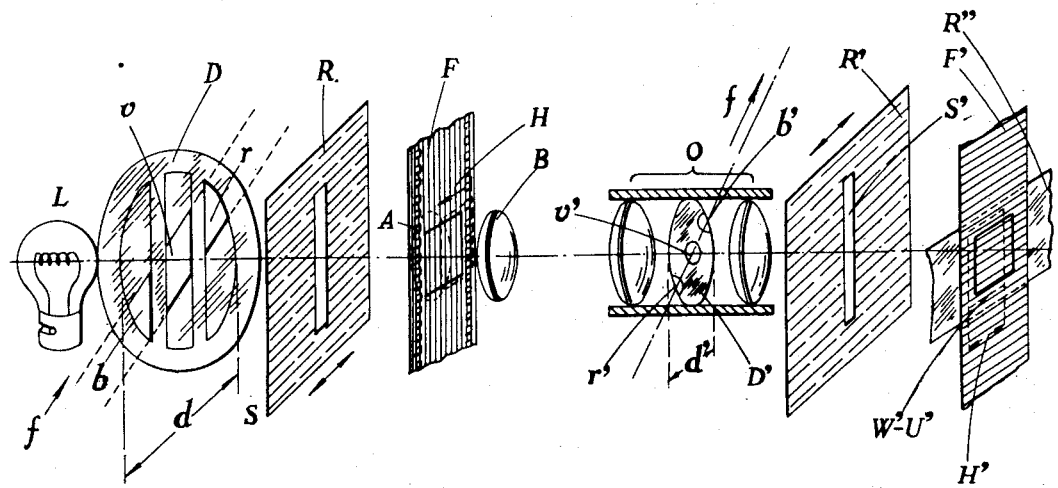
Fig. 1 is a perspective view of known copying apparatus which produces on the copy film elementary images in the form of spots.
Figure 2:
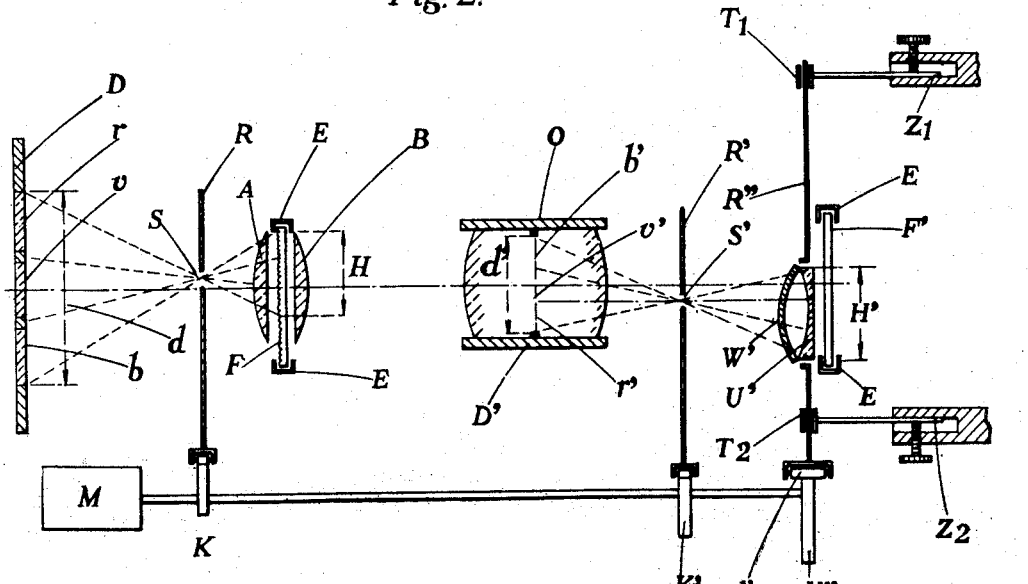
Fig. 2 is a sectional view of the apparatus illustrated in Fig. 1 showing the paths of the light rays.

Referring to Figs. 1 and 2 which show a method of copying lenticular films with non-parallel lenticulations, F and F' are the two films supported in gates E, O the copying objective; A and B are auxiliary lenses; R and R' movable screens provided with conjugate slots S and S' parallel to the lenticulations of the original F and reciprocated by movements, also conjugate perpendicular to their lengths. D is an opaque screen having a window $d$, the form and dimensions of which correspond to the image of the filter which has been employed during the view-taking on the film F; this window, illuminated by a lamp L, comprises a diffusing surface which constitutes the effective surface of the luminous source.

This effective surface illuminates on the original film F, through the slot S, a movable zone of width H and on the copy film F', through the movable slot S', the corresponding movable zone H'. The path of the luminous rays and the formation of the image D' of D in the objective O are diagrammatically illustrated in Fig. 2. A third movable and opaque screen R'', moving in the immediate vicinity of the copy film F' and comprising a window equal to the zone H' and coinciding at any moment with this zone may comprise optical members U' and W', the function of which consists, as disclosed in the copending application Serial No. 147,120, in modifying in the desired sense the angular aperture of the elementary luminous beams given to the lenticulations of the copy film. The mounting and mode of operation of the movable screens R, R' and R'' are shown diagrammatically in Fig. 2. For this purpose cams K, K' and K'' are provided which are operated by the motor M.

It is known, moreover, that in the case of non-parallel cylindrical lenticulations on the two films F and F', the whole of the effective surface of the light source represented by the window $d$, cannot be employed; it is necessary to provide an elongated aperture arranged in the direction indicated by the arrow $f$ diagonally with respect to the lenticulations of the two films. Thus, in the case of the three-colour process, three luminous zones $b$, $v$, $r$ are obtained which each correspond to a part of the view-taking filter. These zones $b$, $v$, $r$ form in effect a slot. They produce images $b'$, $v'$, $r'$ generally situated, relatively to the copy film, in the exit pupil of the copying objective O, as is again illustrated by Figs. 1 and 2.

Figure 3:
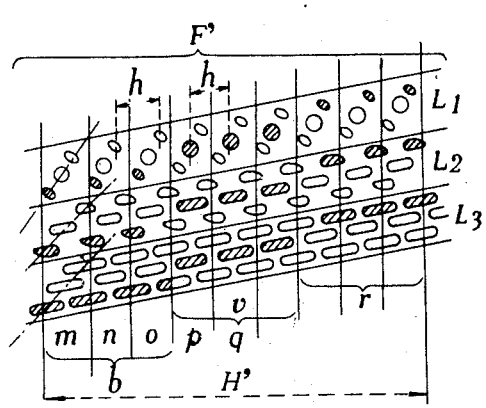
Fig. 3 is a diagram indicating the formation of elementary images on the copy film.

Such an application of the unmodified known means presents several drawbacks which will easily be understood by reference to Fig. 3. In this figure there have been illustrated, on a greatly enlarged scale, the cylindrical lenticulations $L_1$ $L_2$, $L_3$, etc. of the copy film F' the lenticulations of which are arranged obliquely with respect to those of the original. The projections through the interposed optical members on the copy film of the vertical lenticulations $m$, $n$, $o$, $p$, $q$, etc., of the original film are also shown.

It is immediately seen that the luminous beams issuing from the zones $b$, $v$, $r$ of the screen D, which delimits the active surface of the luminous source, produce on the copy film, in each small elementary parallelogram of the line L₁, a group of small spots aligned along a diagonal. Since the illustrated fraction of the copy film corresponds to the zone H', it is seen that in its part b', the luminous rays proceeding from b produce an image only on the lower spots, as indicated by the hatching, in the part v' the spots of the centre, etc. These groups of three spots which occupy only a small fraction of the total surface of the copy film are the only more or less transparent places after the development in reversed positive; the remainder is completely opaque: It is therefore seen that extremely opaque copy films are obtained, that is, films which are projectable with difficulty.

When the optical devices U' mentioned above and illustrated in Fig. 2 are employed, a certain spreading of the microscopic spots is obtained, as is diagrammatically illustrated by the line L₂, but their surface is always very insufficient. On the other hand, these optical systems have the secondary effect of modifying the inclination of the "diagonals" which are seen on the line L₂, relatively to those of the line L₁ of Fig. 3.

The present invention has for its object, to modify the angular aperture of the luminous beams by anamorphosis in order to spread sufficiently the above microscopic spots and in order to utilise in this way the whole of the surface of the emulsion.

To these ends, use may be made, on the one hand, of auxiliary optical systems of a particular type moving in the immediate vicinity of the copy film and employing in combination with screens movable with respect to the film, the distance of these screens being suitably chosen according to the above-mentioned copending application Serial No. 147,120.

In order to act only on the angular aperture of the luminous beams illuminating the copy film, the optical systems U' such as shown in Fig. 2 of a rather short focal length may be employed. But this rather short focal length would involve the use of an optical system U' having very thick edges or a very thick centre, according to whether this optical system is divergent or convergent. Such an optical system would more or less interfere with the obtaining of a good macroscopic image; on the other hand, the great variation which would follow for the direction of the diagonal of the three spots illustrated in Fig. 3 is not a result to be sought after necessarily for itself.

Figure 4:
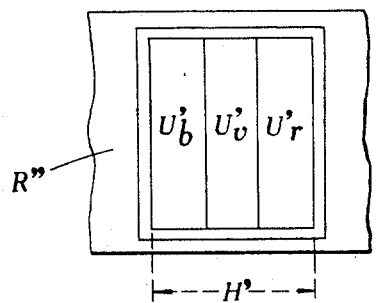
Fig. 4 is a front elevation of an additional optical system in accordance with the present invention.
Figure 5:
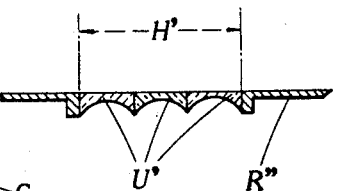
Fig. 5 is a horizontal section through the optical system illustrated in Fig. 4.

As is indicated in Figs. 4 and 5, the optical system U' may be constructed of three glasses U'ᵦ, U'ᵥ, U'ᵣ of the desirable short focal length, each intended to transmit a single partial-image beam. The thickness at the edges or at the centre of such glasses is no longer prohibitive, especially if these lenses are cylindrical, which is particularly recommendable here, and of generatrices parallel to the slot S'.

In Figs. 4 and 5 there has been illustrated in the two projections this particular arrangement of the movable optical systems U' mounted in the movable screen R''. In this way the length of the microscopic spots is increased in the desired measure, as is shown by the line L₃ of Fig. 3.

However, it is possible again to proceed, according to the invention, to the aperture of the of the elementary luminous beams in the direction orthogonal to the lenticulations of the copy film F', that is, the width of these spots. To obtain this supplementary effect, it is possible, according to Figs. 6 to 9, to compose the optical systems U'ᵦ, U'ᵥ, U'ᵣ, illustrated in the three projections and in sections, no longer simply of three cylindrical lenses, the generatrices of which are parallel to S'. For each of the two lateral monochrome pencils, these movable optical systems may be formed by prisms P in sufficient number so as not to lead to too great a thickness; their lines of separation are preferably oblique in order to prevent these lines being inscribed on the emulsion of the film F' during the translation of the whole of the system during copying. These prisms may also be accompanied by glasses having parallel faces G, arranged, for example, on the other face of the optical systems U', in order to guard against the relative sliding of the macroscopic images of the same point which are separately projected on the surface of the emulsion F'.

Figure 8:
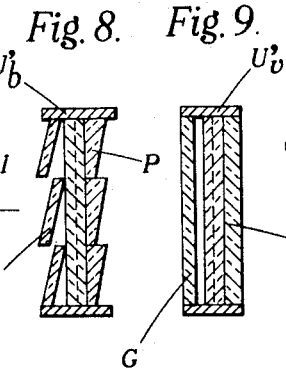
Figs. 7, 8 and 9 are sections on the lines VII—VII, VIII—VIII and IX—IX respectively.
Figure 7:
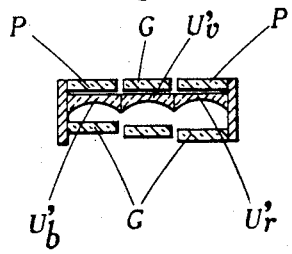

The vertical section of one of the lateral assemblies is illustrated in Fig. 8 and the horizontal section in Fig. 7.

Figure 6:
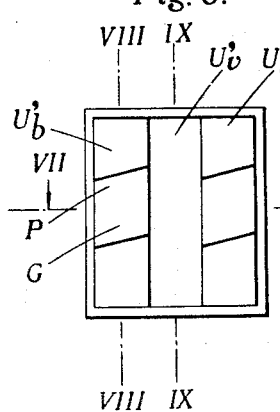
Fig. 6 is a front elevation of a modification of the additional optical system.
Figure 9:
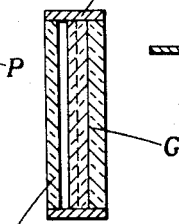

The optical system U' situated at the centre of the movable system U'ᵥ in Fig. 6 does not comprise any prisms P but it may be accompanied by a glass or glasses G having parallel faces of the mean thickness of the prisms and glasses surrounding the lateral optical systems U', as is illustrated in section in Fig. 9.

The optical devices which have just been described act only on the aperture of the luminous beams falling on the copy film F' without affecting the relative aperture of the illuminating active surface d, or that of the objective O.

The additional optical systems W', U', diagrammatically illustrated in Fig. 2 may also be adapted to the printing with decentering, imposed by the position, on the copy film, of the usual sound track.

To this end, the gate of the copy film may be decentered and the diaphragm D' may be given a suitable contour which collects always integrally all the luminous beams issuing from the original film. But the exit pupil is then displaced laterally with respect to the copy film, and in order to restore it to the axis of the latter film, there may be added to the optical system U' a prism P' of very small angle, illustrated in Fig. 15. This prism gives a virtual image of the small exit pupil, decentered in the other direction of equal quantity.

Figure 10:
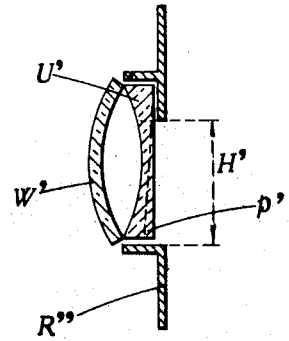
Fig. 10 illustrates details of the adaption of the apparatus of the aforesaid copending applications for the production of copy films on a reduced scale.

The same result can be obtained without adding the prism P', but by making the system W', U' greater than the window H' and by decentering it as shown by Fig. 10.

In order to simplify the explanation, it has been assumed that a single lens U' is employed. It is obvious that the same means of compensation applies in the case of more complex systems illustrated in Figs. 4 and 6.

At a given system W', U' offering given curvatures and indices, the coincidence of the partial images on the film F' may be ensured by acting only on the adjustment of the distance of W', U' relatively to the film F' after focussing. Means permitting of this adjustment are shown in Fig. 2. For this purpose, for example, there may be provided guide members T₁ and T₂ carried by slidable members Z₁ and Z₂ which are fixed in position by set screws. The roller Y against which the cam K'' bears is broadened to permit this adjustment. To simplify Fig. 1 the gate in which the films F and F' slide has not been illustrated.

I claim:

1. In apparatus for copying a photograph comprising a plurality of partial images on a lenticular original film onto a lenticular copy film having lenticulations non-parallel to those of said original film, including movable screens having slots adapted to illuminate relatively narrow homologous parts of the two films and fixed diaphragms associated with the light source and copying optical systems, said diaphragms having elongated apertures so arranged as to reproduce the elementary images on the copy film in the form of spots; means for spreading out the elementary images recorded on the copy film consisting of an additional optical system comprising a plurality of cylindrical divergent lenses, one for each partial image on the original film, said lenses being arranged edge to edge with the generatrices parallel to the lenticulations of the original film, each of said lenses causing divergence of the rays emanating from one partial image of the original film, and means for moving said additional optical systems homothetically with said movable screens.

2. In apparatus for copying a photograph comprising three partial images on a lenticular original film onto a lenticular copy film having lenticulations non-parallel to those of said original film, including movable screens having slots adapted to illuminate relatively narrow homologous parts of the two films and fixed diaphragms associated with the light source and principal copying optical system, said diaphragms having elongated apertures so arranged as to reproduce the elementary images on the copy film in the form of spots; means for spreading out said elementary images consisting of an additional optical system comprising three cylindrical divergent lenses, said lenses being arranged edge to edge with their generatrices parallel to the lenticulations of the original film, each of said lenses causing divergence of the rays emanating from one partial image of the original film, and prisms adjacent one face of each of the two lateral divergent lenses, said prisms being so arranged as to deflect the rays emanating from the partial images in a direction transverse to the lenticulations of the copy film and means for moving said additional optical system homothetically with said movable screens.

3. In apparatus for copying a photograph comprising three partial images on a lenticular original film onto a lenticular copy film having lenticulations non-parallel to those of said original film, including movable screens having slots adapted to illuminate relatively narrow homologous parts of the two films and fixed diaphragms associated with the light source and principal copying optical system, said diaphragms having elongated apertures so arranged as to reproduce the elementary images on the copy film in the form of spots; means for spreading out said elementary images consisting of an additional optical system comprising a plurality of cylindrical divergent lenses, one for each partial image on the original film, said lenses being arranged edge to edge with their generatrices parallel to the lenticulations of the original film, each of said lenses causing divergence of the rays emanating from one partial image of the original film, prisms adjacent one face of each of the two lateral divergent lenses, said prisms being so arranged as to deflect the rays emanating from the partial images in a direction transverse to the lenticulations of the copy film, a glass plate adjacent the central cylindrical lens, said glass plate having parallel faces with a thickness equal to the mean thickness of said prisms, and a similar glass plate adjacent the other face of each of said three cylindrical lenses, said glass plates being so arranged as to compensate for the displacement of the light rays of said prisms on the copy film, and means for moving said additional optical system homothetically with respect to said movable screens.

4. In apparatus for copying a photograph comprising a plurality of partial images on a lenticular original film onto a lenticular copy film having lenticulations non-parallel to those of said original film, including movable screens having slots adapted to illuminate relatively narrow homologous parts of the two films and fixed diaphragms associated with the light source and copying optical systems, said diaphragms having elongated apertures so arranged as to reproduce the elementary images on the copy film in the form of spots; means for spreading out the elementary images recorded on the copy film consisting of an additional optical system comprising a plurality of light diverging means, one for each partial image on the original film, said light diverging means being arranged side by side so that each of said means causes divergence of the rays emanating from a different partial image of the original film, and means for moving said additional optical system homothetically with said movable screens.

5. Apparatus for copying a photograph comprising a plurality of partial images on a lenticular original film onto a lenticular copy film, comprising a light source, a support for the original film, a principal copying optical system, a support for the copy film, the centre of said support being off-set with respect to the principal optical axis of the principal copying optical system, a first diaphragm between said light source and the support for the said original film, a second diaphragm in said principal copying optical system, a first screen movable relatively to the original film and arranged between said first diaphragm and the support for the original film, said screen having a slot, a second movable screen arranged between the principal optical copying system and the support for the copy film, said second screen having a slot conjugate with the slot in said first movable screen, said two slots being parallel to the lenticulations of the original film, means for moving said first and second screens homothetically, whereby relatively narrow and homologous portions of the original and copy film are illuminated simultaneously, and a prism having a relatively small angle displaced homothetically with respect to said movable screens in front of the illuminated portion of the copy film, said prism being arranged to compensate for the effect on the copy film of the apparent relative displacement of the exit pupil of the principal optical copying system caused by the off-setting of the support of the copy film.

ANNE HENRI JACQUES DE
LASSUS SAINT GENIES.